No. 737,816. PATENTED SEPT. 1, 1903.
W. BALASSA.
ELASTIC TIRE FOR VEHICLES.
APPLICATION FILED DEC. 19, 1902.

NO MODEL.

Witnesses.
H. Mori
E. Hanusch

Inventor.
Wilhelm Balassa
by B. Singer
Att'y.

No. 737,816. Patented September 1, 1903.

UNITED STATES PATENT OFFICE.

WILHELM BALASSA, OF VIENNA, AUSTRIA-HUNGARY.

ELASTIC TIRE FOR VEHICLES.

SPECIFICATION forming part of Letters Patent No. 737,816, dated September 1, 1903.

Application filed December 19, 1902. Serial No. 135,895. (No model.)

*To all whom it may concern:*

Be it known that I, WILHELM BALASSA, a citizen of the Empire of Austria-Hungary, residing at 12 Wipplingerstrasse, Vienna, Austria-Hungary, have invented certain new and useful Improvements in Elastic Tires for Vehicles, of which the following is a specification.

This invention relates to sectional tires for vehicle-wheels; and its objects are to provide a tire of this nature that may be readily applied to a wheel and when any section becomes worn or damaged it may be readily removed and a new one inserted.

Figure 1:
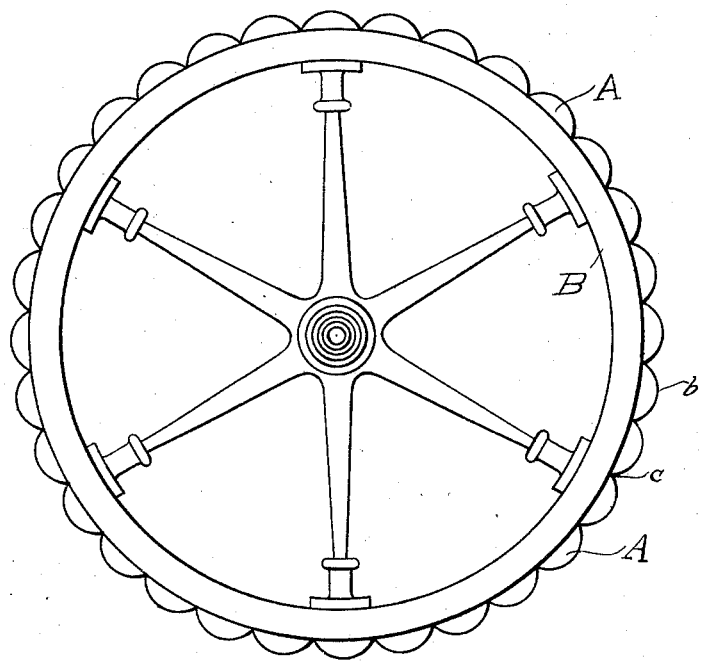
Figure 2:
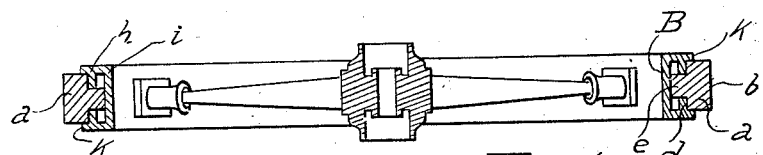
Figure 3:
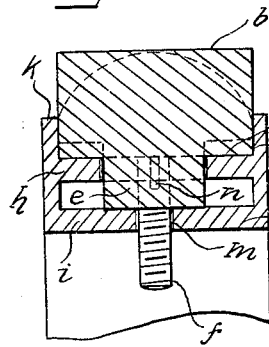
Figure 4:
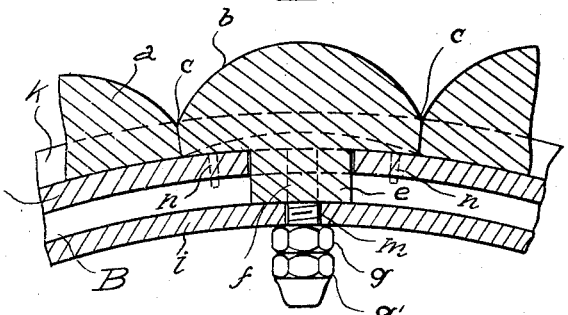

In the drawings, Figure 1 is a side elevation of a wheel provided with a tire embodying this invention. Fig. 2 is a sectional view of the same. Fig. 3 is a cross-section of the rim and tire shown on larger scale. Fig. 4 is a longitudinal sectional view of the parts shown in Fig. 3.

A represents a section or portion of the elastic tire which may be made in as many parts as desired. Each section has a semicircular head $a$, the width of the rim B. The ends of each section are flattened at $c$ so that they may have a bearing one against the other. The lower surface $d$ of the head $a$ is made with a greater degree of curvature than the circumference of the rim, so that it will cling to the same when fastened. Each section is provided with a bolt $f$, secured therein, to fasten the same to the rim.

The rim B as shown is made tubular in section and is provided with flanges $k$ to hold the sections from lateral displacement. Each section is provided with lugs $e$, which pass through apertures in the outer rim-section $h$ and rest against the inner section $i$, the bolts $f$ passing through holes $m$ in the inner rim-section and engaging nuts $g$ and lock-nuts $g'$ hold the sections A in place. Pins $n$ on the inner surface of the sections engage with holes in the outer rim-section to assist in securely holding the sections in place.

Having thus described my invention, the operation of which will be readily understood from the description and drawings, what I claim, and desire to secure by Letters Patent, is—

1. In a sectional elastic tire, the combination of semicircular sections provided with flattened ends adapted to abut one against the other, lugs on said sections, faces on said sections adapted to engage the wheel-rim, said faces being of greater degree of curve than the circumference of the rim, and bolts adapted to secure said sections to the rim.

2. In combination, a tubular flanged wheel-rim, elastic tire-sections, lugs on said sections, apertures in the outer rim member for said lugs, bolts secured in said tire-sections, holes in the inner rim member through which said bolts pass, nuts for engaging said bolts, pins on said sections and holes in the outer rim member for engagement with said pins, substantially as described.

In witness whereof I have hereunto signed my name, this 2d day of December, 1902, in the presence of two subscribing witnesses.

WILHELM BALASSA.

Witnesses:
 ING. LG. KUPFELMACHER,
 ALVESTO S. HOGUE.